(12) United States Patent
Marwaha et al.

(10) Patent No.: US 10,417,711 B1
(45) Date of Patent: Sep. 17, 2019

(54) CONFIGURING INSURANCE POLICY RATE ROUTINES

(71) Applicant: Guidewire Software, Inc., Foster City, CA (US)

(72) Inventors: Gaurav Marwaha, San Francisco, CA (US); Richard Ian Berlin, Campbell, CA (US); Solomon In Kwon, Santa Clara, CA (US)

(73) Assignee: Guidewire Software, Inc., San Mateo, CA (US)

( * ) Notice: Subject to any disclaimer, the term of this patent is extended or adjusted under 35 U.S.C. 154(b) by 435 days.

(21) Appl. No.: 13/756,042

(22) Filed: Jan. 31, 2013

(51) Int. Cl.
*G06Q 40/08* (2012.01)

(52) U.S. Cl.
CPC .................................. *G06Q 40/08* (2013.01)

(58) Field of Classification Search
CPC ...................................................... G06Q 40/08
USPC ............................................................ 705/4
See application file for complete search history.

(56) References Cited

U.S. PATENT DOCUMENTS

| 8,160,903 B2 * | 4/2012 | Schuver et al. | 705/4 |
| 2003/0074235 A1 * | 4/2003 | Gregory | 705/4 |

* cited by examiner

*Primary Examiner* — Namrata Boveja
*Assistant Examiner* — Joseph F. Ecker
(74) *Attorney, Agent, or Firm* — Van Pelt, Yi & James LLP

(57) ABSTRACT

A technique of configuring insurance policy rate routines includes accessing information representing an insurance product or information representing an insurance policy transaction. It further includes receiving a user input from a user indicating that a rate routine operand is to map to a portion of the information representing the insurance product or a portion of the information representing the insurance policy transaction. It further includes processing the information representing the insurance product or the information representing the insurance policy transaction to obtain one or more appropriate configuration options for the rate routine operand, based at least in part on a context of the rate routine operand. It further includes presenting the one or more appropriate configuration options to the user.

21 Claims, 11 Drawing Sheets

```xml
<?xml version="1.0"?>
<entity
    xmlns="http://guidewire.com/datamodel"
    entity="PolicyLine"
    type="effdated"
    desc="A line of insurance (e.g. auto, property, etc.) and selected policy line level attributes (i.e. attributes necessary, but not sufficient to rate)"
    abstract="true"
    effDatedBranchType="PolicyPeriod"
    exportable="true"
    extendable="true"
    final="false"
    javaClass="com.guidewire.pc.domain.policy.lines.policyLine"
    platform="false"
    loadable="false"
    table="policyline">
    <implementsInterface
        iface="gw.api.policy.PolicyLineMethods"
        impl="gw.api.policy.PolicyLineMethodsDefaultImpl"/>
    <implementsInterface
        iface="gw.api.copier.EffDatedCopyable"
        impl="gw.lob.common.PolicyLineCopier"/>
    <implementsInterface
        iface="gw.api.logicalmatch.EffDatedLogicalMatcher"
        impl="gw.lob.common.PolicyLineMatcher"/>
```

FIG. 6

| | | | Base rate and Adjusted Rate calculation 704 | | |
|---|---|---|---|---|---|
| Organization Search | 1 | -- | | table:BaseRate | |
| Producer Code Search | 2 | BaseRate | | | |
| Region Search | 3 | | R | .001 | Round Base Rate to thousandths (Round Half Up) |
| Roles | 4 | vehicleTypeFactor | ↓ | table:VehicleTypeFactor | |
| Authority Profiles | 5 | vehicleCostFactor | ↓ | table:VehicleCostFactor | |
| Rating | 6 | AdjustedRate | ↓ | BaseRate | Determine Adjusted Rate |
| Attributes | 7 | | × | table:CoverageFactor | |
| Workflows | 8 | | × | table:UWCompanyFactor | |
| Regions | 9 | | × | PolicyLine.PAMultiCarDiscount | |
| Event Messages | 10 | | × | min(vehicleCostFactor, vehicleTypeFactor) | |
| Holidays | 11 | | | Term Amount Determination | |
| Script Parameters | 12 | -- | | | |
| | 13 | IF | | AdjustedRate < table:MinPremium And Vehicle.VehicleType = Vehicle.Type.Other | |

FIG. 7 (Cont.)

CONFIGURING INSURANCE POLICY RATE ROUTINES

BACKGROUND OF THE INVENTION

Today, most large insurance carriers use enterprise scale management systems to manage insurance policy information. Typically, systems used for rating policies are separate from systems that handle policy transactions and maintain policy data (e.g., the rating and policy systems may be operated by different companies). Because the rating systems typically do not have access to policy data, whenever a change is made to the configuration of policy data on a policy system, corresponding modifications must also be made to the rating system in order for the rating system to be able to take into account the new changes. This can be burdensome, as it requires careful management and coordination between the two systems in order to keep track of any new changes to policy data that should also be considered by the rating system.

BRIEF DESCRIPTION OF THE DRAWINGS

Various embodiments of the invention are disclosed in the following detailed description and the accompanying drawings.

DETAILED DESCRIPTION

Figure 1:
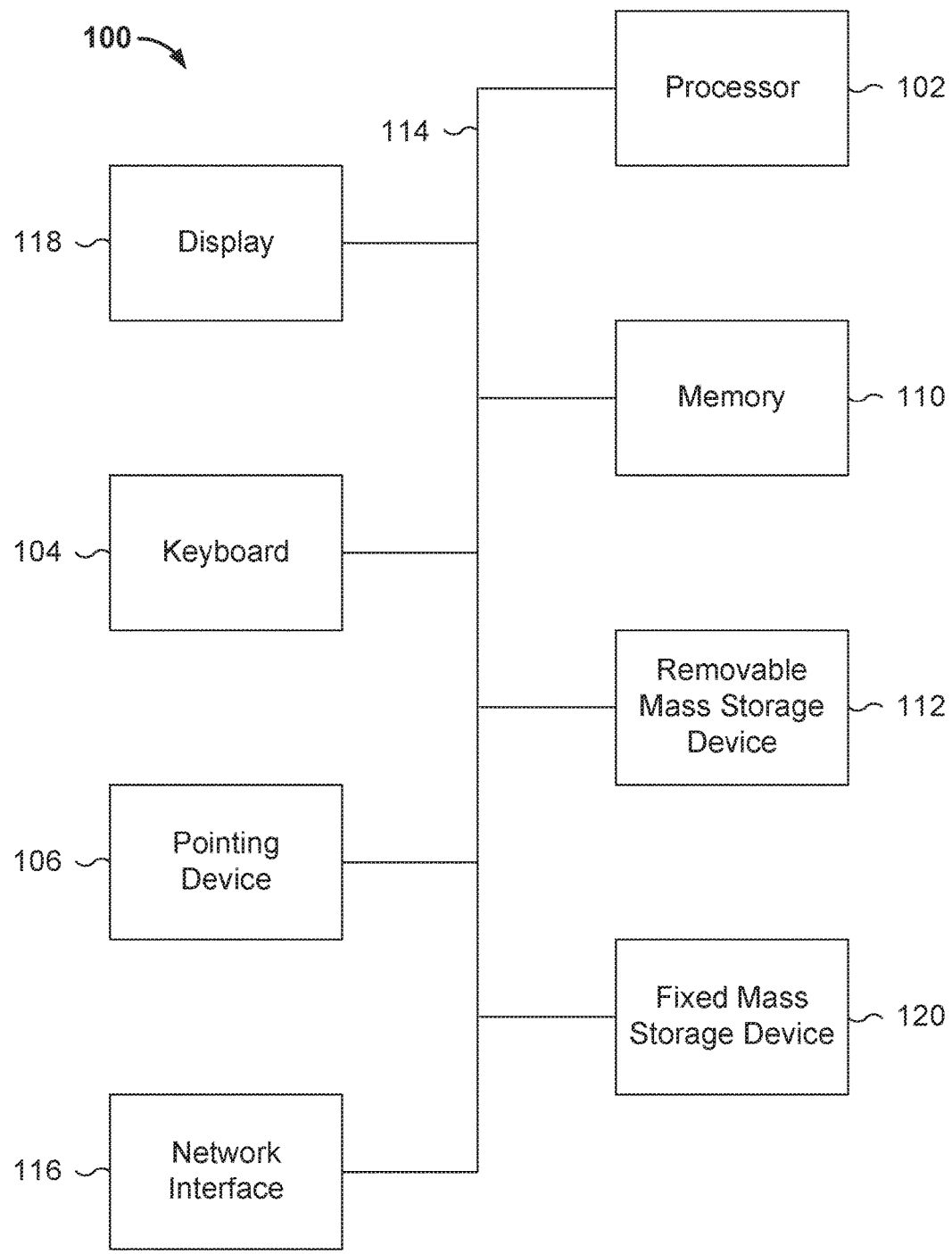
FIG. 1 is a functional diagram illustrating an embodiment of a programmed computer system for configuring insurance policy rate routines.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring insurance policy rate routines is disclosed. In some embodiments, configuring insurance policy rate routines includes configuring insurance rate routines, which, as used herein, refers to operations with operators and operands that are configured and used to determine the cost (e.g., premium) of insurance coverages on an insurance policy to be quoted. As used herein, insurance coverages describe limits, deductibles, or other conditions for covering items on an insurance policy against loss or damage.

In some embodiments, in order to support the configuration of rate routines, information representing an insurance product (e.g., product to be sold, such as insurance policy) or information representing an insurance policy transaction (e.g., account information including names of policy owners, ages, addresses, etc.) is accessed. In some embodiments, a user input from a user is received that indicates that an operand of a rate routine being configured is to map to a portion of the accessed information. In some embodiments, the accessed information is processed to obtain appropriate configuration options for the rate routine operand based on a context of the rate routine operand. In some embodiments, the appropriate configuration options are presented to the user. For example, if a rate routine operand is associated with a mathematical operator (context of the operand), only numerical options included in accessed information are found and presented as appropriate configuration options for the rate routine operand.

FIG. 1 is a functional diagram illustrating an embodiment of a programmed computer system for configuring insurance policy rate routines. As will be apparent, other computer system architectures and configurations can be used to configure insurance policy rate routines. Computer system 100, which includes various subsystems as described below, includes at least one microprocessor subsystem (also referred to as a processor or a central processing unit (CPU) 102). For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to configure insurance policy rate routines.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage device 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a non-transitory computer readable medium that includes program code for performing various computer-implemented operations. The computer-readable medium is any data storage device that can store data which can thereafter be read by a computer system. Examples of non-transitory computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
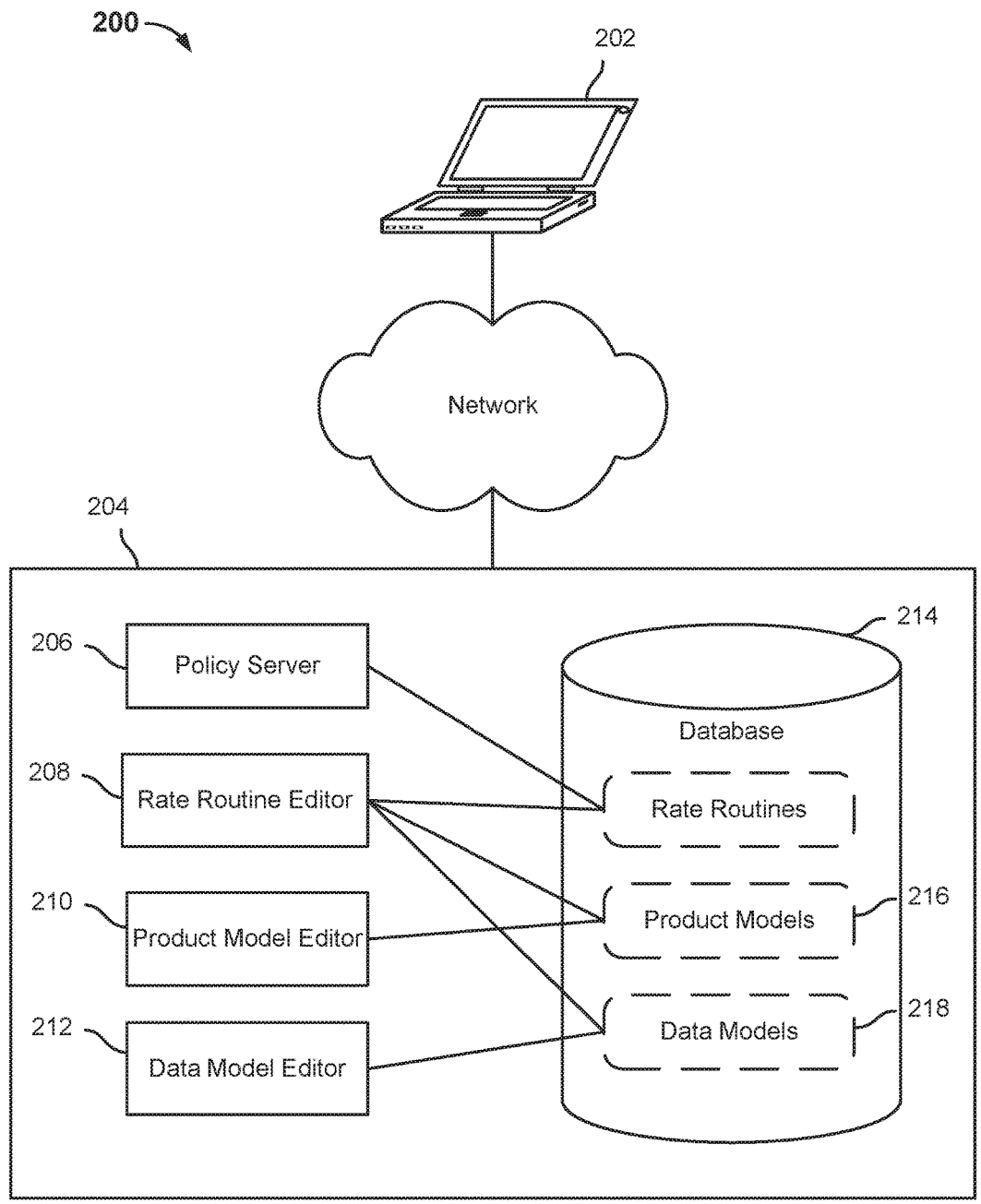
FIG. 2 is a system diagram illustrating an embodiment of a system for configuring insurance policy rate routines.

FIG. 2 is a system diagram illustrating an embodiment of a system for configuring insurance policy rate routines. In this example, a client device 202 communicates with insurance quoting and rating system 204 via a network in system 200. Examples of device 202 include a laptop computer, a desktop computer, a smart phone, a mobile device, a tablet device or any other appropriate computing device. As shown, device 202 is configured to communicate with the insurance quoting and rating system 204, which includes policy server 206, rate routine editor 208, product model editor 210, data model editor 212, and database 214. In various embodiments, an application such as a web browser or a client application is installed at device 202 to enable communication with insurance quoting and rating system 204.

In this example, policy server 206 has logic for handling quotes for insurance policies, including generating policy offerings, handling policy transactions, receiving policy transaction information, archiving policy quotes and policy data in database 214, etc. As shown, rate routine editor 208 has logic for editing/configuring rate routines, archiving rate routines in database 214, etc. In some embodiments, stored rate routines are used by policy server 206 to generate a quote for a policy.

In this example, product model editor 210 has logic for editing/configuring insurance product models, which in some embodiments are hierarchical data structures representing insurance product offerings (e.g., policies and included coverages that are offered as insurance products) and configuration information pertaining to available insurance products. Insurance products and product models will be described in more detail below. In some embodiments, product model editor 210 includes product model definitions used to define insurance product models. In some embodiments, defined product models and associated data structures are archived in database 214. As shown, data model editor 212 has logic for editing/configuring insurance data models, which will be described in more detail below. In some embodiments, data models are archived in database

214. In the example shown, rate routine editor 208 is integrated with policy server 206, product model editor 210, data model editor 212, and database 214, allowing the rate routine editor to have access to insurance policy data, such as product models (216) and data models (218), stored within database 214 and which can be used in configuring rate routines.

In some embodiments, configuring an insurance policy rate routine includes configuring rate routines. In some embodiments, rate routines include operations that are configured/specified (e.g., via an editor user interface) and used to determine the cost/premium of insurance coverages (e.g., liability coverage) on a policy.

In some embodiments, the rate routine includes a parameter set that defines the scope and relevance of the rate routine. In some embodiments, the parameter set specifies various types of data items (e.g., policy line or line of business, coverage, vehicle (e.g., captured vehicle information or vehicle coverage information)) relevant to the rate routine and define its scope. The parameter set can also be used as context when determining an appropriate list of candidate options when configuring an operand, as will be described in more detail below. For example, the list of potential operands that are presented can depend on the line of business that the rate routine is associated with (e.g., if the line of business is commercial property, don't show operands tied only to personal auto).

In some embodiments, the rate routine includes various instructions that are used to calculate a premium. Each instruction can include multi-step operations, with each operation specifying an operator and an operand that the operator acts upon. In various embodiments, the operators include mathematical operators (e.g., multiplication, addition, subtraction, division, etc.), assignment operators (e.g., to load a variable which can in turn be used by other operations), or any other appropriate operator. In various embodiments, operands include dates, Booleans, strings, numerical values (e.g., constants, integers, etc.), function calls, table lookups (e.g., lookup of values in a rate table including insurance factors and values), policy data (e.g., information representing an insurance product or information representing an insurance policy transaction, etc.), or any other appropriate operand.

In some embodiments, configured rate routines are stored (e.g., in database 214 of FIG. 2) for later use in determining a quote for an insurance policy.

Figure 3:
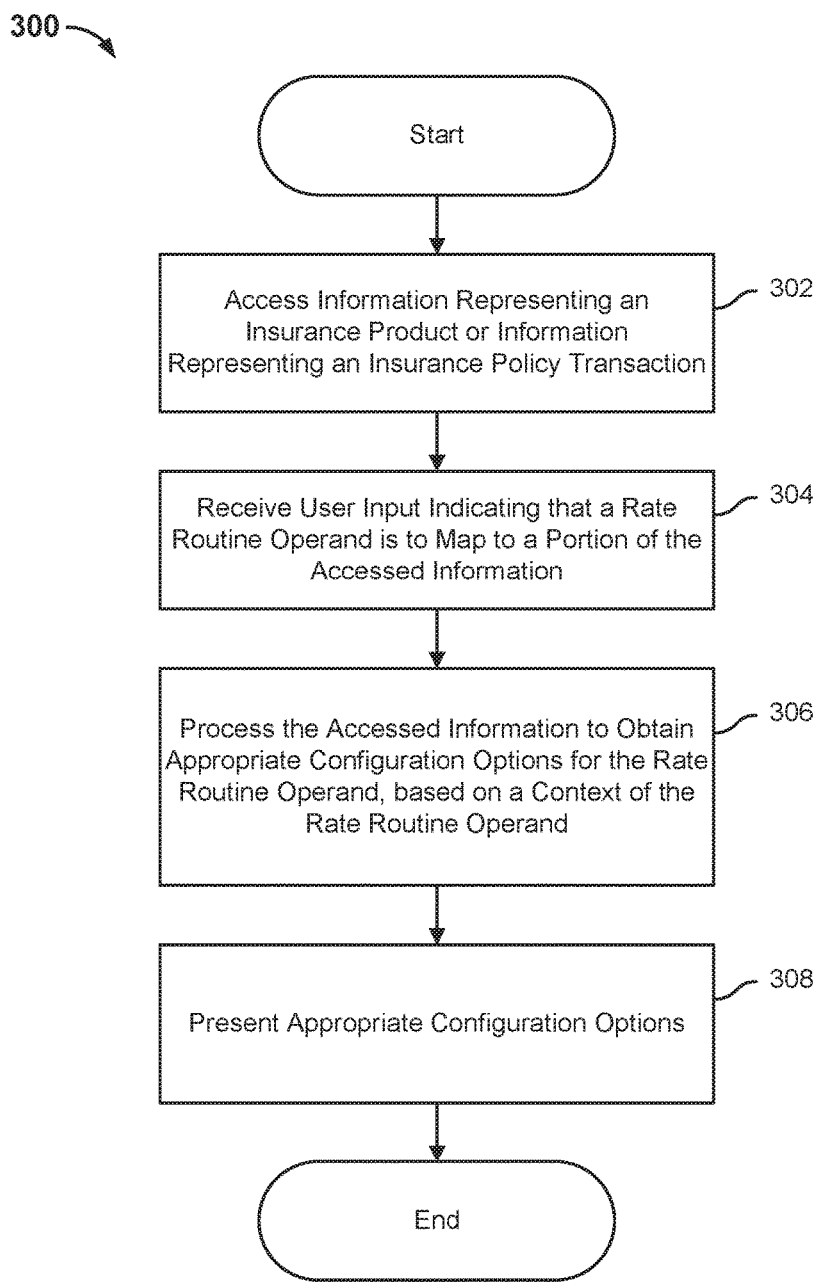
FIG. 3 is a flow diagram illustrating an embodiment of a process for configuring insurance policy rate routines.
Figure 7:
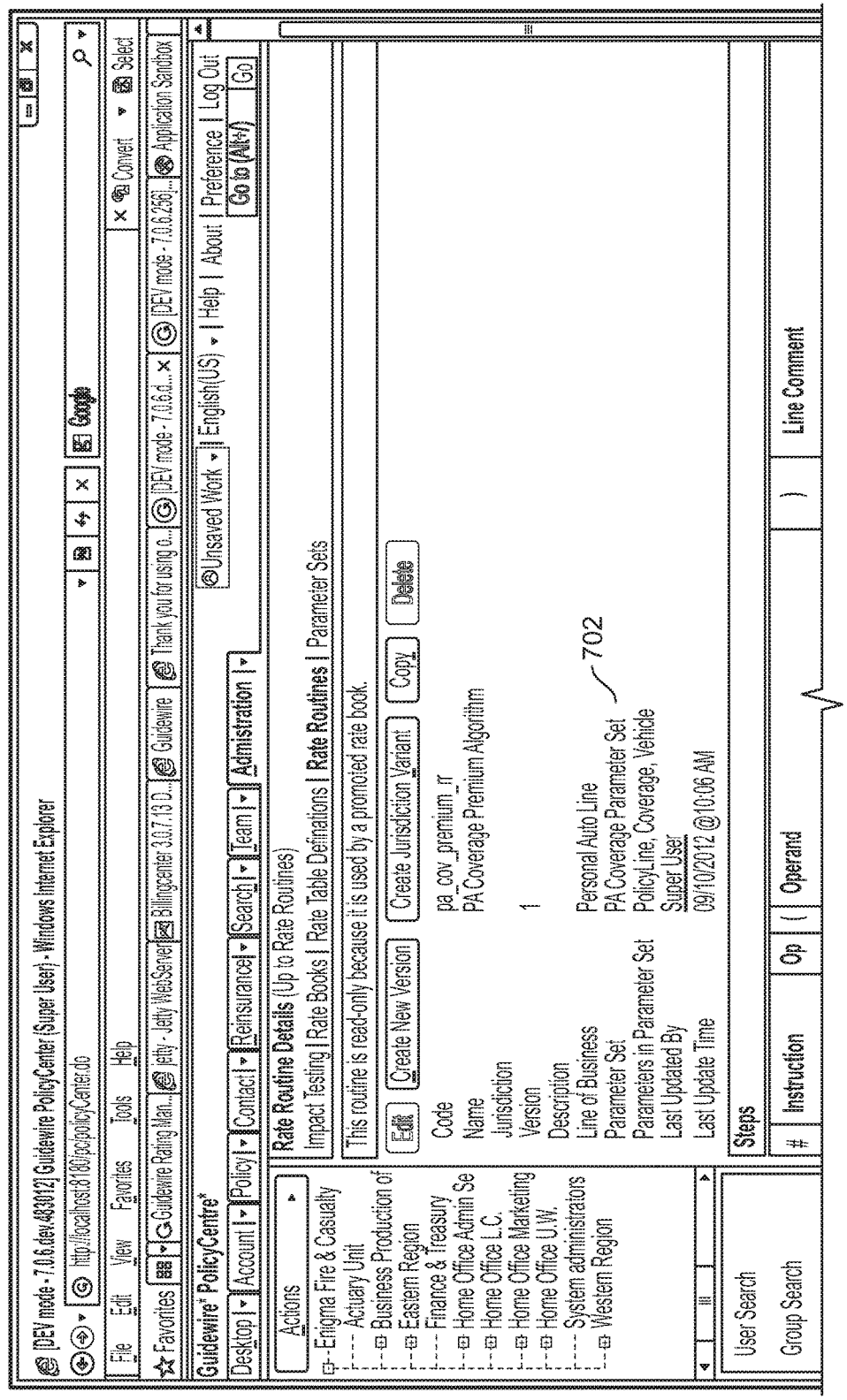
FIG. 7 is a diagram illustrating an embodiment of a rate routine editor interface for configuring a rate routine.

FIG. 3 is a flow diagram illustrating an embodiment of a process for configuring insurance policy rate routines. In some embodiments, process 300 of FIG. 3 is executed by rate routine editor 208 of FIG. 2. A user interface for configuring rate routines is shown in FIG. 7. The process begins at 302 when information representing an insurance product or information representing an insurance policy transaction is accessed. In some embodiments, accessing information representing an insurance product includes accessing product models. In some embodiments, an insurance product model refers to a hierarchical data structure (e.g., graph, tree, etc.) pertaining to insurance product offerings (e.g., coverage items and coverage terms under a line of business), which will be described in more detail below. In some embodiments, a defined product model includes objects representing various product offerings (e.g., policy objects such as coverage items, coverage terms, etc.).

In some embodiments, accessing information representing an insurance policy transaction includes accessing data models. In some embodiments, a data model refers to a data structure representing policy transaction information that is not included in insurance product information. In some embodiments, the data structure for the data model includes an XML document based on a data model definition, or any other appropriate type of data structure. The policy transaction information may include information that is captured during a request to quote a policy, and may include personal information, such as age, address, names of drivers, percentage of time that drivers drive a vehicle (e.g., if two people each drive a vehicle 50% of the time), account information, or any other appropriate information. In some embodiments, the data model includes non-product information that does not change the products that are offered (e.g., does not affect structure of a policy offering, such as coverages and coverage terms that fall under a policy line). The data model will be described in more detail below.

At 304, user input indicating that a rate routine operand is to map to a portion of the accessed information is received. In some embodiments, the user input is received as a user (e.g., an actuary) configures, for example, via a rate routine editor, an operand in an instruction included in a rate routine. In some embodiments, the user input indicates that the rate routine operand is to map to a portion of the accessed information representing an insurance product (e.g., product model information) or information representing an insurance policy transaction (e.g., data model information).

At 306, the accessed information is processed to obtain appropriate configuration options for the rate routine operand, based on a context of the rate routine operand. In some embodiments, the processing includes inferring appropriate configuration options for the rate routine operand based on the context of the rate routine operand.

In some embodiments, processing information representing an insurance product includes traversing a product model, for example, by traversing the hierarchical data structure of a product model and returning objects appropriate for the operand based on the context of the rate routine operand. In some embodiments, processing information representing an insurance policy transaction includes traversing an XML document representing a data model and returning objects appropriate for the operand based on the context of the rate routine operand.

In some embodiments, the context of the rate routine operand includes an operator that is to operate upon the operand. For example, if the operator is a mathematical operator, then the information representing the insurance product or the information representing the insurance policy transaction will be processed to identify policy data items (e.g., data objects/entities) that correspond to numerical data types (e.g., integers, constants, etc.) or other data types that are appropriate for mathematical operators. Variables that are the targets of assignment operators can take on the data type of the values they are assigned to. For example, if a variable "mybaserate" is assigned a base rate integer value, then the variable "mybaserate" is also associated with the integer data type, and may be included as a processed data item.

In some embodiments, the context of the rate routine operand includes the parameters defined in the parameter set associated with the rate routine being configured. In some embodiments, objects under the scope of the defined parameters or objects that can be reached by objects within the defined scope are processed. For example, a parameter set can specify parameters such as "policy line," "coverage," and "vehicle." In some embodiments, given the policy line (also referred to as line of business), only objects included under the policy line are traversed when searching for potential configuration options for operands, while objects under other policy lines are not traversed. For example, if the rate routine is associated with the personal auto policy line product offering, objects under the personal auto product model tree are traversed, while other policy line products, such as the product model for the commercial property policy line are not processed. Similarly, in some embodiments, only objects associated with the coverages of the specified policy line are traversed to identify potential configuration options. Additionally, objects associated with vehicles can also be processed.

Thus, in the previous example in which a mathematical operator was configured, objects of numerical data types that fall within the scope defined by the parameter set can be identified as appropriate configuration options for the rate routine operand. Additionally, because a rate routine editor has access to product model and data model information, as the product models and data models are modified (e.g., by adding new policy data objects or changing data objects or data structures), the modifications will be automatically processed by the rate routine, and appropriate configuration options can be dynamically determined that take into account any newly added or changed objects.

At 308, appropriate configuration options for the rate routine operand are presented. In some embodiments, objects returned from processing are included in a list of candidate configuration options appropriate for the rate routine operand based on its context, and are presented to the user for selection (e.g., via a menu). In some embodiments, a user selection of one of the configuration options is received.

Figure 4:
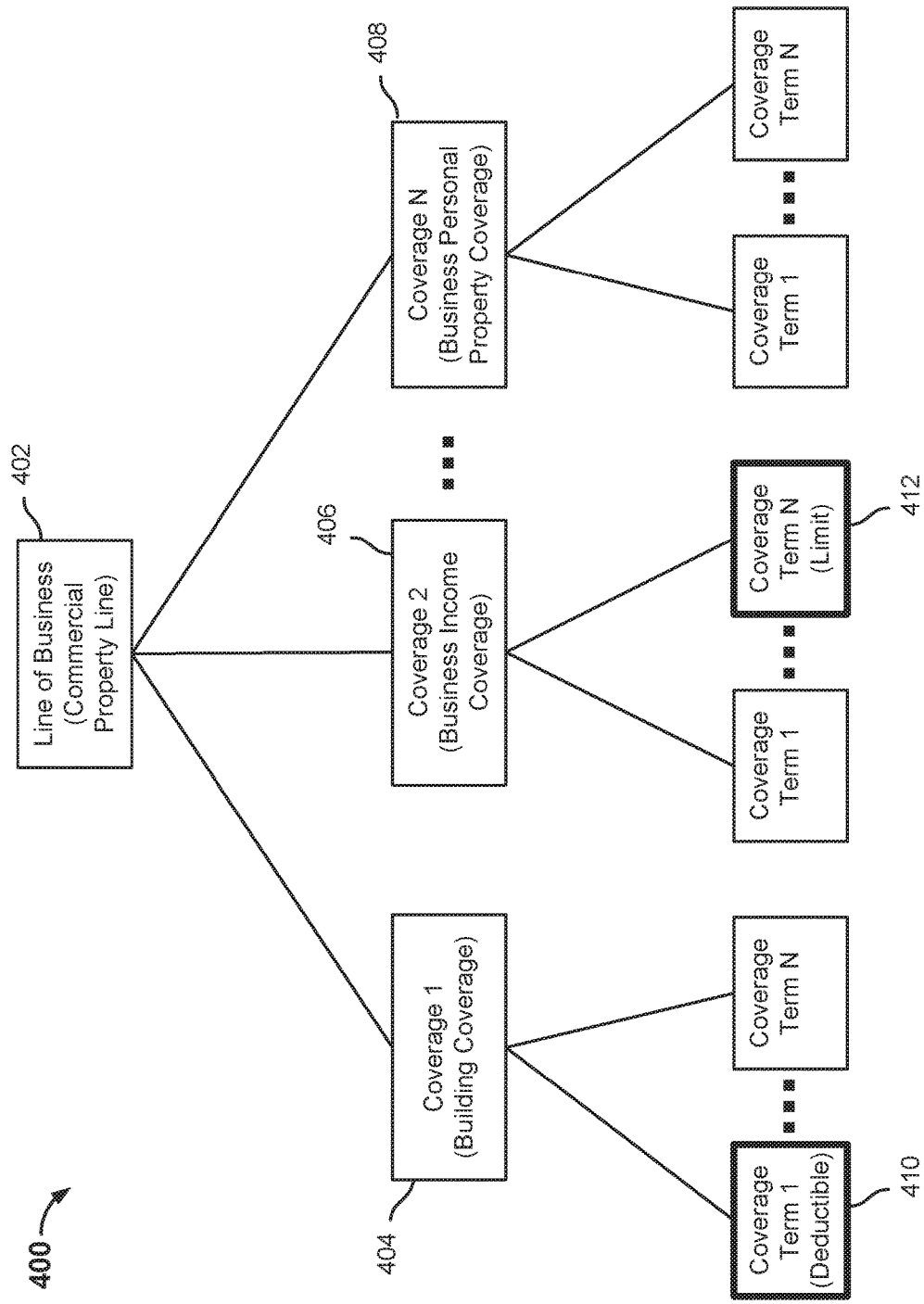
FIG. 4 is a diagram illustrating an embodiment of a product model for an insurance product offering.

FIG. 4 is a diagram illustrating an embodiment of a product model for an insurance product offering. In some embodiments, a product model is a hierarchical data structure that includes objects/entities defining an insurance product offering. In some embodiments, the product model is edited/configured using an editor such as product model editor 210 of FIG. 2. In some embodiments, the product model is defined based on product model definitions.

In some embodiments, a product model such as product model 400 is traversed (e.g., as in process step 306 of FIG. 3) to determine potential candidate configuration options for an operand.

In the example shown, the data structure is a hierarchical graph/tree structure that has at its root an entity (402) representing the policy line of the offered product. In the example shown, the policy line of business is commercial property.

The next level of the hierarchy includes coverage items that fall under the policy line of business (e.g., items covered by policy). In the example shown, the commercial policy line includes coverage items such as building coverage 404, business income coverage 406, business personal property coverage 408, etc.

The next level of the hierarchy includes coverage terms associated with each of the coverage items. For example, building coverage 404 may include deductible coverage terms (e.g., deductible monetary value), limit coverage terms (e.g., limit monetary value), etc. The coverage terms may also include other values such as modifiers that specify discounts or price increases.

As described above, a product model such as product model 400 is processed to determine potential candidate configuration options for an operand. For example, if the commercial property line is specified as part of the scope of a rate routine being configured, product model 400, which is associated with the commercial property line, is traversed, and a subset of items/objects included in the product model that can be used as applicable options for an operand (e.g., 410 and 412) are selected and returned. In some embodiments, the objects selected are selected based on their type (e.g., numeric type that is applicable given the context of a mathematical operator, which has already been specified).

Figure 5:
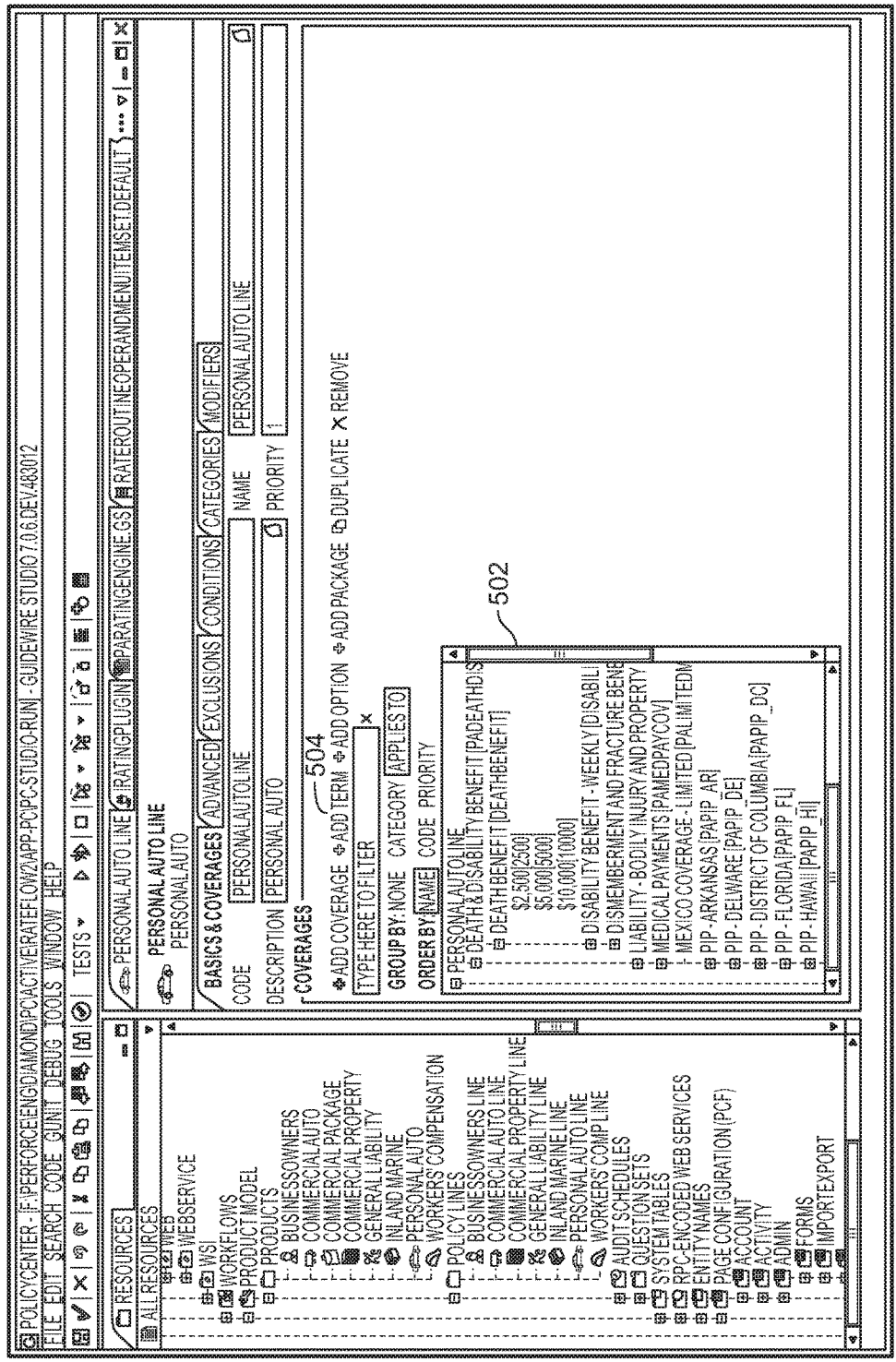
FIG. 5 is a diagram illustrating an embodiment of a product model editor interface for configuring a product model.

FIG. 5 is a diagram illustrating an embodiment of a product model editor interface for configuring a product model such as product model 400 of FIG. 4. In this example, a personal auto line configuration is shown. At 502, the hierarchical tree structure of the product model for the personal auto line policy product is shown. The personal auto policy line includes coverages such as death and disability benefit, disability benefit (weekly), and dismemberment and fracture damage. Under each coverage, terms of the coverage can be configured. In the example shown, the values for the death benefit coverage term have been defined/configured to be $2,500, $5,000, and $10,000. In some embodiments, the structure of the hierarchy is defined using a product model definition. Other coverage terms can be defined with values (e.g., associated with numerical values). In some embodiments, products and their associated product models can also be modified, for example, to add additional coverages and terms to the policy line at 504. The modifications can be saved and accessed by the rate routine editor to determine appropriate configuration options for rate routine operands.

Figure 6:
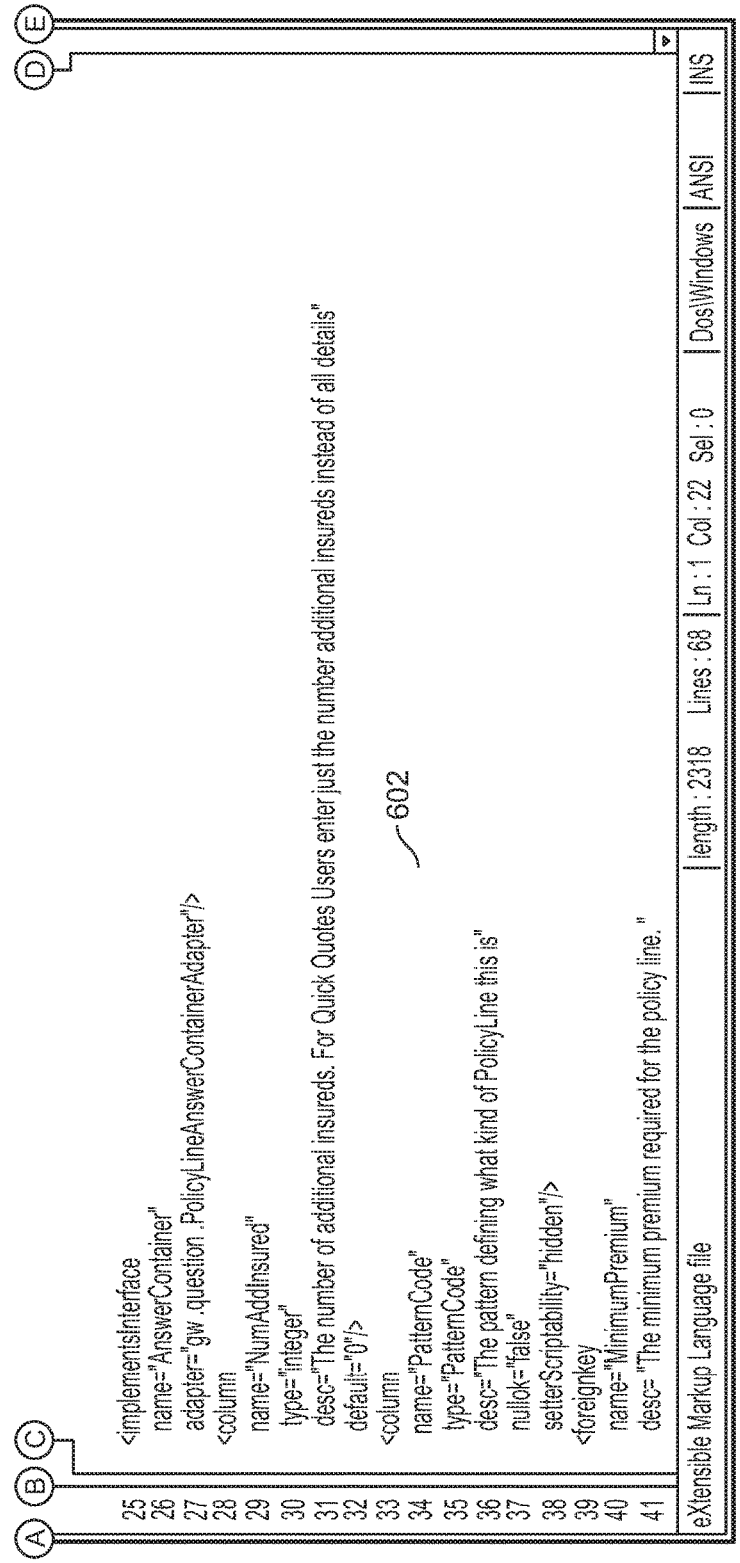
FIG. 6 is a diagram illustrating an embodiment of a data model editor interface for configuring a data model.

FIG. 6 is a diagram illustrating an embodiment of a data model editor interface for configuring a data model. As described above, the data model includes information that is not part of product offering information, and can include policy transaction information that is captured during a request for a quote of a policy. The data model can be specified separately from the product model in a different data structure. In the example shown, an XML document that indicates the objects that are associated with a policy line as well as their type is shown. In the example shown, the objects include the number of additional insured (integer), code (logical code name used by processing code, of type patterncode), a minimum premium (numerical data type), etc. (602).

As discussed previously with respect to FIG. 3, FIG. 7 is a diagram illustrating an embodiment of a rate routine editor interface for configuring a rate routine. At 702, an example of a parameter set is shown. In the example shown, the line of business is "Personal Auto Line," the name of the parameter set is "PA Coverage Parameter Set," and the parameters included in the parameter set are "PolicyLine," "Coverage," and "Vehicle." The parameter set defines the scope of the rate routine and can be used as context for determining appropriate configuration options for a rate routine operand. At 704, examples of instructions and associated operators and operands are shown.

Figure 8:
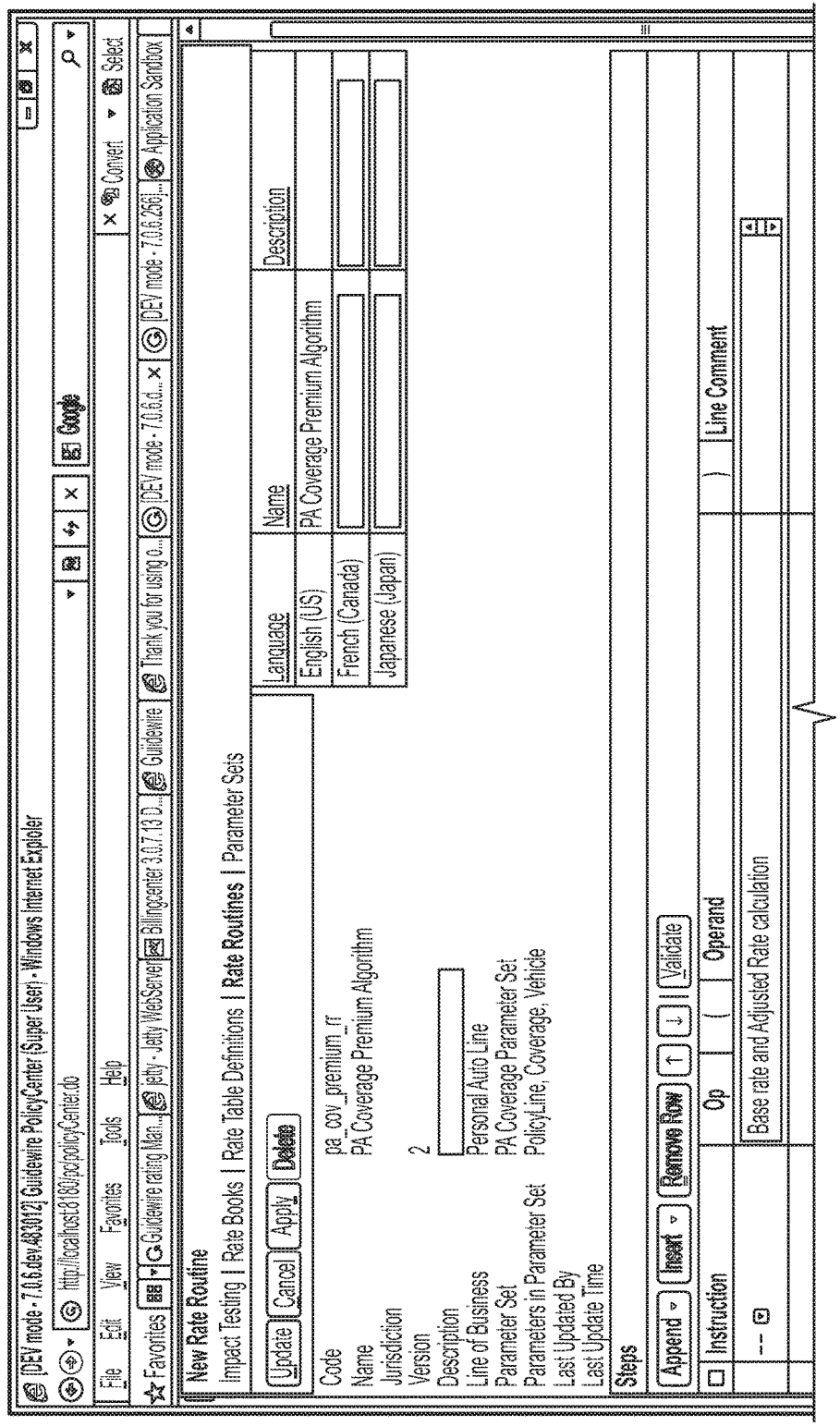
FIG. 8 is a diagram illustrating an embodiment of a rate routine editor interface for configuring a rate routine operand.
Figure 8:
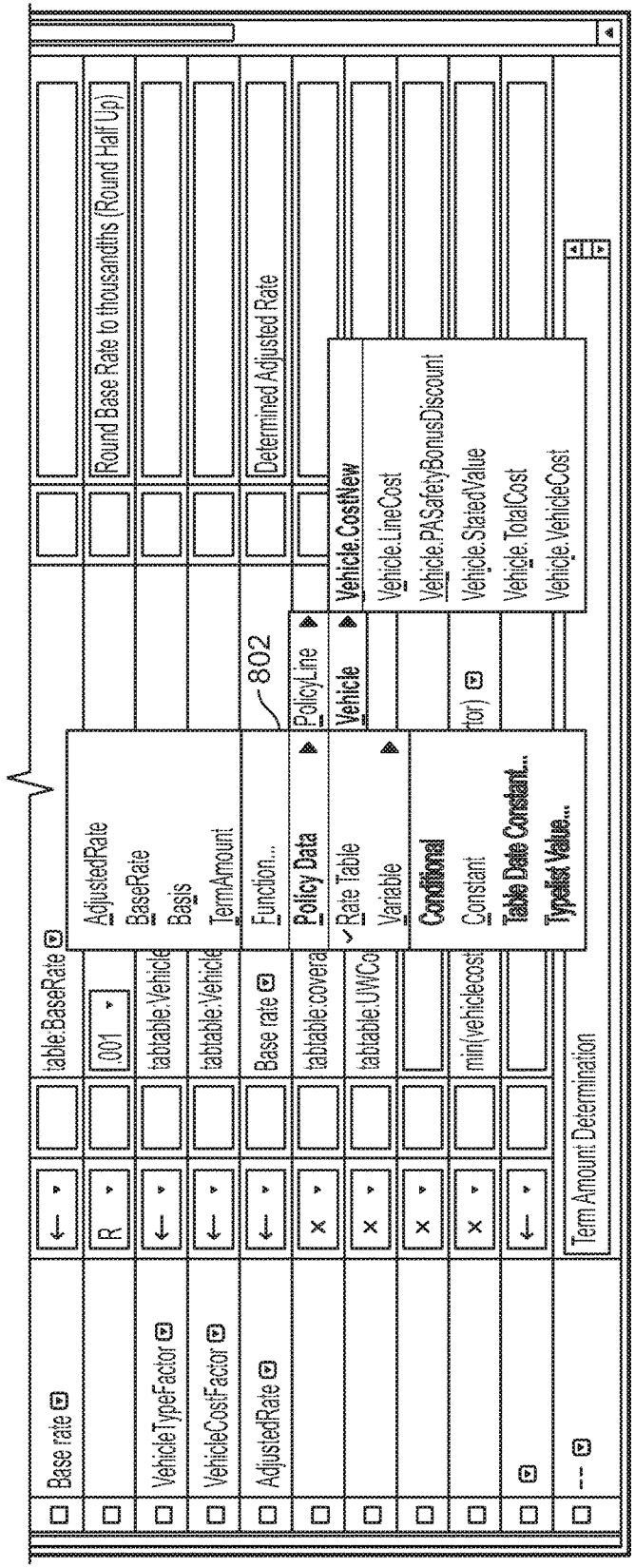

FIG. 8 is a diagram illustrating an embodiment of a rate routine editor interface for configuring a rate routine operand. In the example shown, at 802, an operand is being configured. A user input has been received indicating that the rate routine operand is to be mapped to "policy data" (e.g., information representing an insurance product or information representing an insurance policy transaction). A sub-menu is shown off of "policy data," showing two subgroupings of policy data, "policy line" and "vehicle," which were specified in the parameter set and used to define the scope of the rate routine. As the "vehicle" option has been selected, a further menu including a list of appropriate configuration options for the rate routine operand is presented. In some embodiments, the list of appropriate candidate configuration options was determined based on the processing described above and the context of the rate routine operand (e.g., data type appropriate to corresponding rate routine operator and scope of rate routine defined by parameter set). The user can then specify which of the candidate configuration options they would like to apply to the rate routine operand.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   accessing a data store including information representing an insurance product, information representing an insurance policy transaction, or both;
   receiving, via a user interface, a user input from a user indicating that a rate routine operand is to map to a subset of the information representing the insurance product, the information representing the insurance policy transaction, or both;
   in response to receiving the user input via the user interface, dynamically identifying, using one or more computer processors and based at least in part on a context of the rate routine operand, one or more candidate configuration options appropriate for the rate routine operand from the information representing the insurance product, the information representing the insurance policy transaction, or both;
   displaying, in a set of menu items in the user interface, at least a portion of the one or more candidate configuration options dynamically identified as appropriate for the rate routine operand based at least in part on the context of the rate routine operand; and
   receiving, via the user interface, a user selection of at least one of the displayed candidate configuration options, wherein the selected at least one of the displayed candidate configuration options is applied to the rate routine operand in response to the user selection.

2. The method of claim 1, wherein the information representing the insurance product includes a product model.

3. The method of claim 1, wherein the information representing the insurance product includes configuration information pertaining to available insurance products.

4. The method of claim 1, wherein the information representing the insurance policy transaction includes a data model.

5. The method of claim 1, wherein the information representing the insurance policy transaction includes information captured during a policy transaction.

6. The method of claim 1, wherein dynamically identifying the one or more candidate configuration options includes includes traversing objects associated with the information representing the insurance product, the information representing the insurance policy transaction, or both.

7. The method of claim 6, wherein the one or more appropriate candidate configuration options are determined during the traversing.

8. The method of claim 1, further comprising receiving a user input from the user defining a rate routine operator associated with the rate routine operand.

9. The method of claim 1, wherein the context includes parameters associated with a rate routine.

10. The method of claim 8, wherein the context includes the rate routine operator associated with the rate routine operand.

11. A system, comprising:
    one or more computer processors configured to:
    access a data store including information representing an insurance product, information representing an insurance policy transaction, or both;
    receive, via a user interface, a user input from a user indicating that a rate routine operand is to map to a subset of the information representing the insurance product, the information representing the insurance policy transaction, or both;
    in response to receiving the user input via the user interface, dynamically identify, based at least in part on a context of the rate routine operand, one or more candidate configuration options appropriate for the rate routine operand from the information representing the insurance product, the information representing the insurance policy transaction, or both;
    display, in a set of menu items in the user interface, at least a portion of the one or more candidate configuration options dynamically identified as appropriate for the rate routine operand based at least in part on the context of the rate routine operand; and
    receive, via the user interface, a user selection of at least one of the displayed candidate configuration options, wherein the selected at least one of the displayed candidate configuration options is applied to the rate routine operand in response to the user selection; and
    a memory coupled to the one or more computer processors and configured to provide the one or more computer processors with instructions.

12. The system of claim 11, wherein the information representing the insurance product includes a product model.

13. The system of claim 11, wherein the information representing the insurance product includes configuration information pertaining to available insurance products.

14. The system of claim 11, wherein the information representing the insurance policy transaction includes a data model.

15. The system of claim 11, wherein the information representing the insurance policy transaction includes information captured during a policy transaction.

16. The system of claim 11, wherein dynamically identifying the one or more candidate configuration options includes traversing objects associated with the information representing the insurance product, the information representing the insurance policy transaction, or both.

17. The system of claim 16, wherein the one or more appropriate candidate configuration options are determined during the traversing.

18. The system of claim 11, wherein the set of one or more processors is further configured to receive a user input from the user defining a rate routine operator associated with the rate routine operand.

19. The system of claim 18, wherein the context includes the rate routine operator associated with the rate routine operand.

20. A computer program product embodied in a non-transitory tangible computer readable storage medium and comprising computer instructions for:
    accessing a data store including information representing an insurance product, information representing an insurance policy transaction, or both;
    receiving, via a user interface, a user input from a user indicating that a rate routine operand is to map to a subset of the information representing the insurance product, the information representing the insurance policy transaction, or both;

in response to receiving the user input via the user interface, dynamically identifying, using one or more computer processors and based at least in part on a context of the rate routine operand, one or more candidate configuration options appropriate for the rate routine operand from the information representing the insurance product, the information representing the insurance policy transaction, or both;

displaying, in a set of menu items in the user interface, at least a portion of the one or more candidate configuration options dynamically identified as appropriate for the rate routine operand based at least in part on the context of the rate routine operand; and receiving, via the user interface, a user selection of at least one of the one or more displayed candidate configuration options, wherein the selected at least one of the displayed candidate configuration options is applied to the rate routine operand in response to the user selection.

21. The system of claim 1, wherein, when dynamically identifying the candidate configuration options appropriate for the rate routine operand, a portion of the accessed information representing the insurance product, the information representing the insurance policy transaction, or both is excluded from being processed, and wherein the portion of the accessed information representing the insurance product, the information representing the insurance policy transaction, or both that is excluded is determined based at least in part on the context of the rate routine operand.

* * * * *